United States Patent [19]

Astner et al.

[11] Patent Number: 5,711,266
[45] Date of Patent: Jan. 27, 1998

[54] CYLINDER HEAD FOR AN INTERNAL COMBUSTION ENGINE

[75] Inventors: Josef Astner, Stuttgart, Germany; Lucian Betke, Pod Zavêrkon, Czechoslovakia

[73] Assignee: Mercedes-Benz AG, Stuttgart, Germany

[21] Appl. No.: 762,523

[22] Filed: Dec. 9, 1996

[30] Foreign Application Priority Data

Dec. 21, 1995 [DE] Germany ............... 195 48 088.0

[51] Int. Cl.$^6$ ........................................... F02F 7/00
[52] U.S. Cl. ........................................... 123/193.5
[58] Field of Search ................... 123/193.5, 193.3, 123/90.27, 432

[56] References Cited

U.S. PATENT DOCUMENTS

| | | | |
|---|---|---|---|
| 5,050,544 | 9/1991 | Tanaka et al. | 123/193.5 |
| 5,365,900 | 11/1994 | Farnlund et al. | 123/193.5 |
| 5,609,129 | 3/1997 | Hauf et al. | 123/193.5 |

FOREIGN PATENT DOCUMENTS

| | | |
|---|---|---|
| 36 37 199 | 5/1988 | Germany. |
| 37 10 453 | 10/1988 | Germany. |
| 42 35 103 | 5/1993 | Germany. |
| 43 15 233 | 7/1994 | Germany. |

OTHER PUBLICATIONS

ATZ Automobiltechnische Zeitschrift, Nr. 11, Jan. 1, 1994, pp. 3–5, "Interdisziplinare Motoren–Entwicklung Vom Konzept Bis Zur Serie".

Primary Examiner—Marguerite McMahon
Attorney, Agent, or Firm—Klaus J. Bach

[57] ABSTRACT

In a cylinder head for an internal combustion engine having a plurality of cylinders in an in-line arrangement and including two intake and two exhaust valves for each cylinder wherein one intake and one exhaust valve are disposed at opposite sides of a longitudinal center line of the cylinder head and arranged around an injection nozzle disposed in the center of a combustion chamber, the cylinder head includes an injector trough extending centrally along the cylinder head top with spaced bores extending from the injector trough into the combustion chambers and receiving the injectors, and intake and exhaust valve rocker arms and camshafts are disposed on opposite sides of the injector troughs for operating the intake and exhaust valve at the opposite sides of the injector trough.

19 Claims, 4 Drawing Sheets

CYLINDER HEAD FOR AN INTERNAL COMBUSTION ENGINE

BACKGROUND OF THE INVENTION

The invention relates to a cylinder head for an internal combustion engine with two intake and two exhaust valves per cylinder arranged around a central injector, one of each of said intake and exhaust valves being disposed at each side of a longitudinal center line of the cylinder head.

DE 36 37 199 A1 discloses a cylinder head for an internal combustion engine with two intake valves and two exhaust valves per cylinder. For each cylinder, there is an intake valve and an exhaust valve at each side of a longitudinal axis of the cylinder head and the valves are arranged around an injector disposed about in the center of the cross-sectional area of the cylinder. The valves have shafts which are engaged by rocker arms that are actuated by a camshaft.

In this known arrangement, the rocker arms are disposed on the cylinder head in engagement with the valve shafts and are operated by a cam shaft via push rods. In such an arrangement, the cam shaft is disposed in a lower part of the engine where it is difficult to access in case it needs a repair. Because of the relatively great length of the push rods, there is also a relatively large amount of tolerances in the kinematics between the camshaft and the valves which results in more complicated valve adjustment procedures. The reference does not disclose how the injector is disposed and mounted in the cylinder head.

DE 42 35 103 A1 discloses a cylinder head with a camshaft—valve control arrangement for an internal combustion engine wherein two intake and two exhaust valves are provided for each cylinder. The intake valves of all the cylinders of a row of cylinders are all disposed in a line and so are all the exhaust valves. In this way, one cam shaft can be provided for all the aligned intake valves and another camshaft can be provided for all the aligned exhaust valves. One of the camshafts operates all the intake valves by way of individual rocker arms and another camshaft operates all the exhaust valves by way of individual rocker arms. The valves of one cylinder row are so inclined that their axis intersect on a center plane extending normal to the separation plane between the cylinder block and the cylinder head. Since the camshaft extends directly over the center of the cylinder head the arrangement is not suitable however for internal combustion engine engines with fuel injection wherein, for a highly uniform fuel distribution, the injector should be arranged in the longitudinal axis of each cylinder.

It is the object of the present invention to provide a cylinder head for an internal combustion engine with two intake and two exhaust valves per cylinder arranged around a fuel injector which is disposed in the cylinder as centrally as possible but wherein the lubricant carrying space in the cylinder head is separated from the fuel carrying injectors.

SUMMARY OF THE INVENTION

In a cylinder head for an internal combustion engine having a plurality of cylinders in an in-line arrangement and including two intake and two exhaust valves for each cylinder wherein one intake and one exhaust valve are disposed at opposite sides of a longitudinal center line of the cylinder head and arranged around an injection nozzle disposed in the center of a combustion chamber, the cylinder head includes an injector trough extending centrally along the cylinder head top with spaced bores extending from the injector trough into the combustion chambers and receiving the injectors, and intake and exhaust valve rocker arms and camshafts are disposed on opposite sides of the injector troughs for operating the intake and exhaust valve at the opposite sides of the injector trough.

The main advantage of the cylinder head according to the invention resides in the fact that the injector trough is completely separated from the cylinder head lubricant space so that fuel cannot flow into the engine if an injector should leak.

In a preferred embodiment, the injector troughs include bores which extend co-axially with the cylinder axes from the trough to the resective cylinders and which receive the injectors. With such an arrangement, the fuel is centrally injected into the cylinder and is uniformly distributed over the whole cylinder cross-section. In order to prevent that the arrangement increases the height of the cylinder head components, the trough is formed integrally into the cylinder head during casting of the cylinder head. In order to provide for arches in the cylinder head which are as flat as possible, it is advantageous if the valves are inclined with respect to each other at only small angles. It is therefore advantageous if the valve shafts are so arranged that they enclose an angle with the cylinder axis of between 2° and 15°, preferably 6° to 8°. The valves may be so arranged that they have all the same angle with the cylinder axis. However, the valve axes of at least two valves of each cylinder may be disposed at different angles.

In order to support the injector on the cylinder head as free from vibrations as possible, the bore receiving the injector should have an appropriate length. For this purpose, it is considered to be appropriate if the bottom surface of the injector trough is almost at the level of the upper end of the valve shafts. Furthermore, it is appropriate to provide in the injector trough between two adjacent bores a wall extending from the bottom surface of the injector trough upwardly by which several injector cavity sections are formed. These separating walls may include screw channels for mounting the support means for the injectors for example.

It is further advantageous if the valve arrangement of each cylinder is slightly turned with respect to the longitudinal center axis of a cylinder head whereby the valve shafts of the valves have different distances from the longitudinal center axis of the cylinder head. With such an arrangement, the intake passages leading to the intake valves can be better shaped and oriented for an optimal arrangement. For such a turned valve arrangement, it is considered to be particularly suitable if the axes of the inlet valves of a particular cylinder intersect a first straight line which is disposed in the plane of the cylinderhead bottom and extends at an angle of about 60° to the longitudinal center axis whereas the valve axes of the respective exhaust valves intersect a second straight line which extends at an angle of about 75° to the longitudinal center axis.

Each of the camshafts is designed to operate the intake and exhaust valves at one side of the longitudinal center axis of the cylinder head and each of the camshafts has alternately arranged intake and exhaust cams. With this valve arrangement and such a valve control of the intake and exhaust valves the dead volume of the combustion chambers, that is the volume of the combustion chambers outside the piston cavity can be substantially reduced. The rocker arms are preferably roller-operated single arm levers which, at one end are supported on a valve rocker fulcrum pin and have their other ends disposed on the upper ends of the valve shafts.

In order to prevent contact between the outer surface of the injector body and the side walls of the injector trough, the injector trough is curved outwardly in the area of the injectors so that a gap is provided between the injector and the injector trough wall. In the areas between two adjacent injectors, the width of the injector trough is somewhat reduced. It is also advantageous to provide on the wall of the injector trough axially and inwardly extending projections. This has the advantage that with constant wall thickness, the space requirements for the injector trough are somewhat reduced and space for valve shafts or space for the camshaft bearing covers can be provided.

The invention will become more readily apparent from the following description of a cylinder head on the basis of the accompanying drawings.

DESCRIPTION OF A PREFERRED EMBODIMENT

Figure 1:
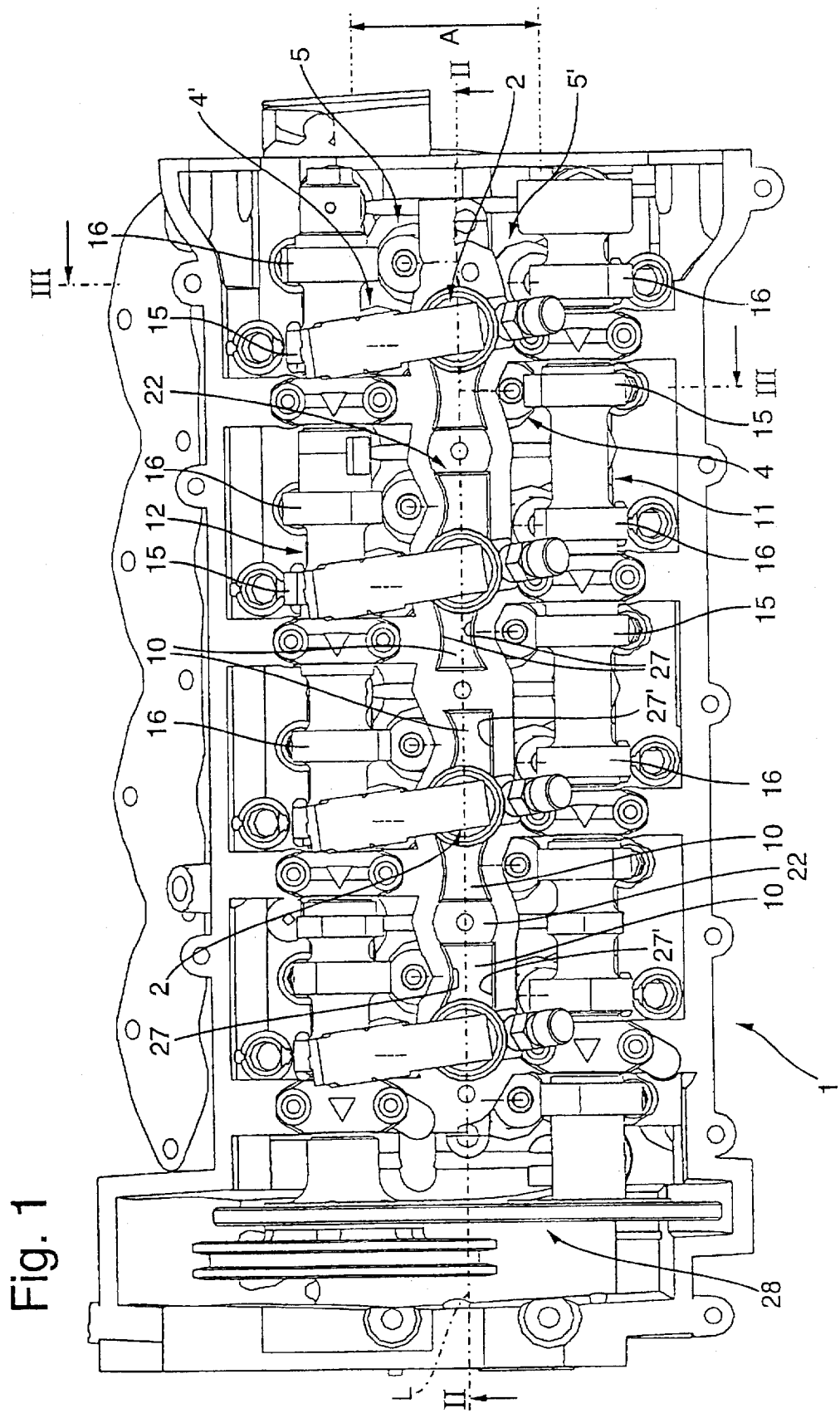
FIG. 1 is a top view of a cylinder head with two cam shafts.

FIG. 1 is a top view of a cylinder head 1 provided for an internal combustion engine with four cylinders arranged in a line. Four injectors 2 are arranged along a longitudinal center line L and four valves are arranged around each injector 2 that is two intake valves 4, 4' and two exhaust valves 5, 5' (see also FIG. 4). The arrangement is such that one intake valve 4 and one exhaust valve 5' or respectively, one intake valve 4' and one exhaust valve 5 are provided at each side of the longitudinal center line L. Two camshafts 11 and 12 are mounted on the cylinder head 1 so as to extend parallel to each other at a distance A. They are coupled by a belt drive 28. Each camshaft 11, 12 includes intake cams 15 and exhaust cams 16. The intake and exhaust cams 15, 16 are disposed alternately in accordance with the arrangement of the valves which are disposed below the camshafts and which also alternate in the direction of the longitudinal center line L. Between the camshafts 11, 12, there is formed in the cylinder head an injector trough 10 which extends from the front-most to the rear most injector 2. The injector trough 10 is defined partially by a wall 27 which is partially inwardly curved and partially by a flat wall 27'. Because of this configuration, the width of the trough 10 varies. Between two adjacent injectors 2, the trough 10 includes dividing walls 22 so that the trough is not continuous over its whole lengths.

Figure 2:
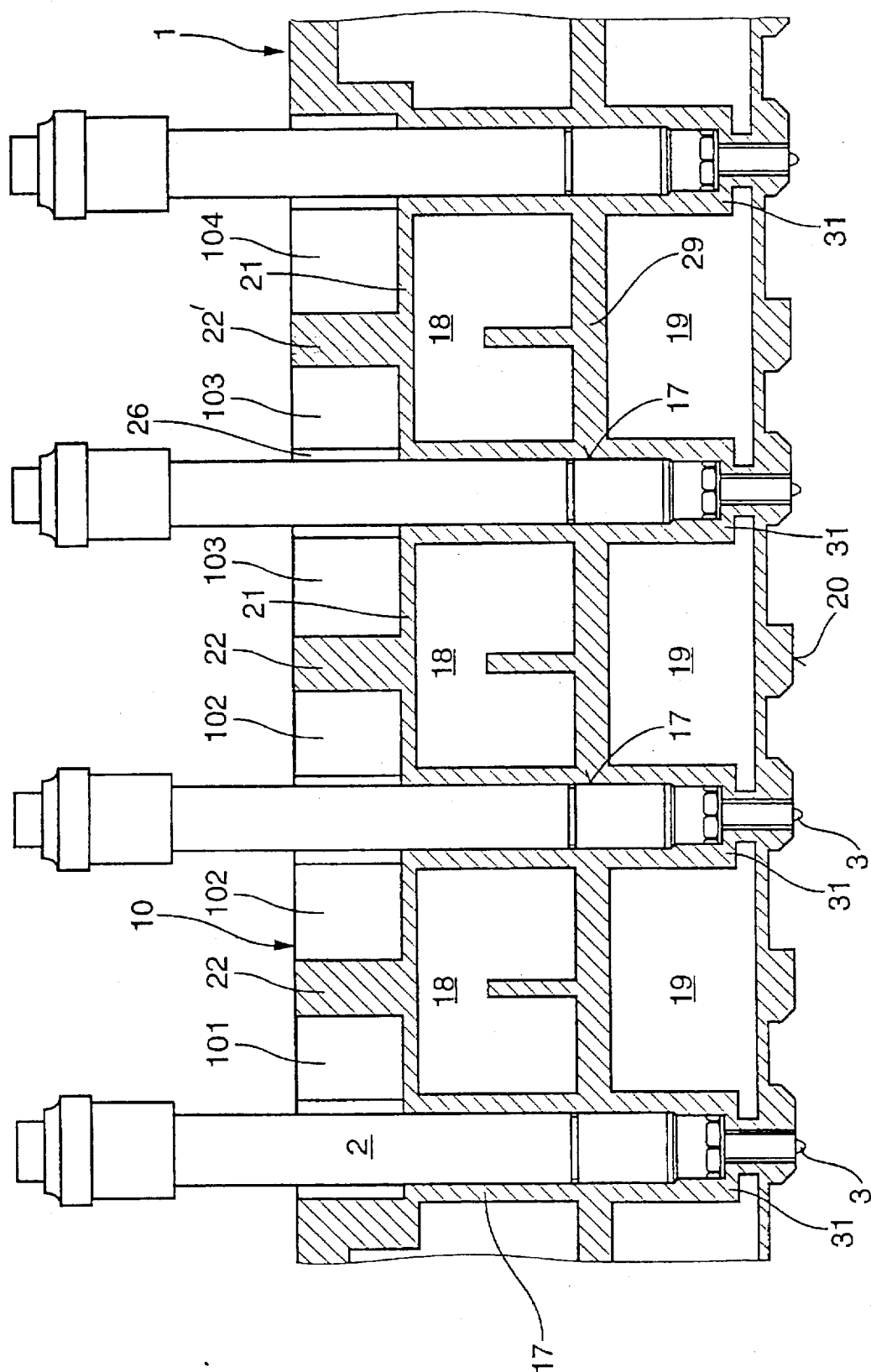
FIG. 2 is a cross-sectional view taken along line II—II of FIG. 1, showing the single piece cast cylinder head with the injectors mounted therein.

FIG. 2 is a cross-sectional view taken along line II—II of FIG. 1 showing the cylinder head 1 cast as a single piece and the injectors 2 mounted therein. The injector trough 10 extends along the top side of the cylinder head 1 and has a bottom surface 21 which is parallel to the top edge of the cylinder head 1. From the injector trough 10 bores 17 extend through the cylinder head to the cylinder head bottom 20. Near the cylinder head bottom 20, the bores have a shoulder 31. Above the cylinder head bottom 20, the cylinder head 1 includes spaces 19 which serve as coolant channels. Each of the bores 17, receives an injector 2 firmly held in position in a vibration-free manner. At their lower ends, the injectors have injection nozzles 3 through which fuel is admitted to the combustion chambers.

Between adjacent injectors 2, the injector trough 10 includes dividing walls 22 which extend vertically upwardly from the bottom surface 21, and which divide the injector trough into several injector trough sections 101, 102, 103, 104. In the area of each injector 2, the injector trough is arc-like widened such that the wall 26 of the injector trough surrounds the injector with an essentially uniform distance. Between the bottom surface 21 of the injector trough 10 and the spaces 19 for the engine coolant, there are hollow spaces 18 which are separated from the spaces 19. The hollow spaces 18 are part of the oil space in which the upper ends of the valve shafts, the rocker arms, the valve springs etc. are disposed. Between the bottom surface 21 of the injector trough 10 and the cylinder head bottom 20 the cylinder head 1 includes only sufficient cast material at opposite sides of the separating wall 29 so that the bores 17 can be formed therethrough. The cylinder head design provides for a noticeable weight reduction. In FIG. 2, the valves and valve seats are not shown for clearer representation.

Figure 3:
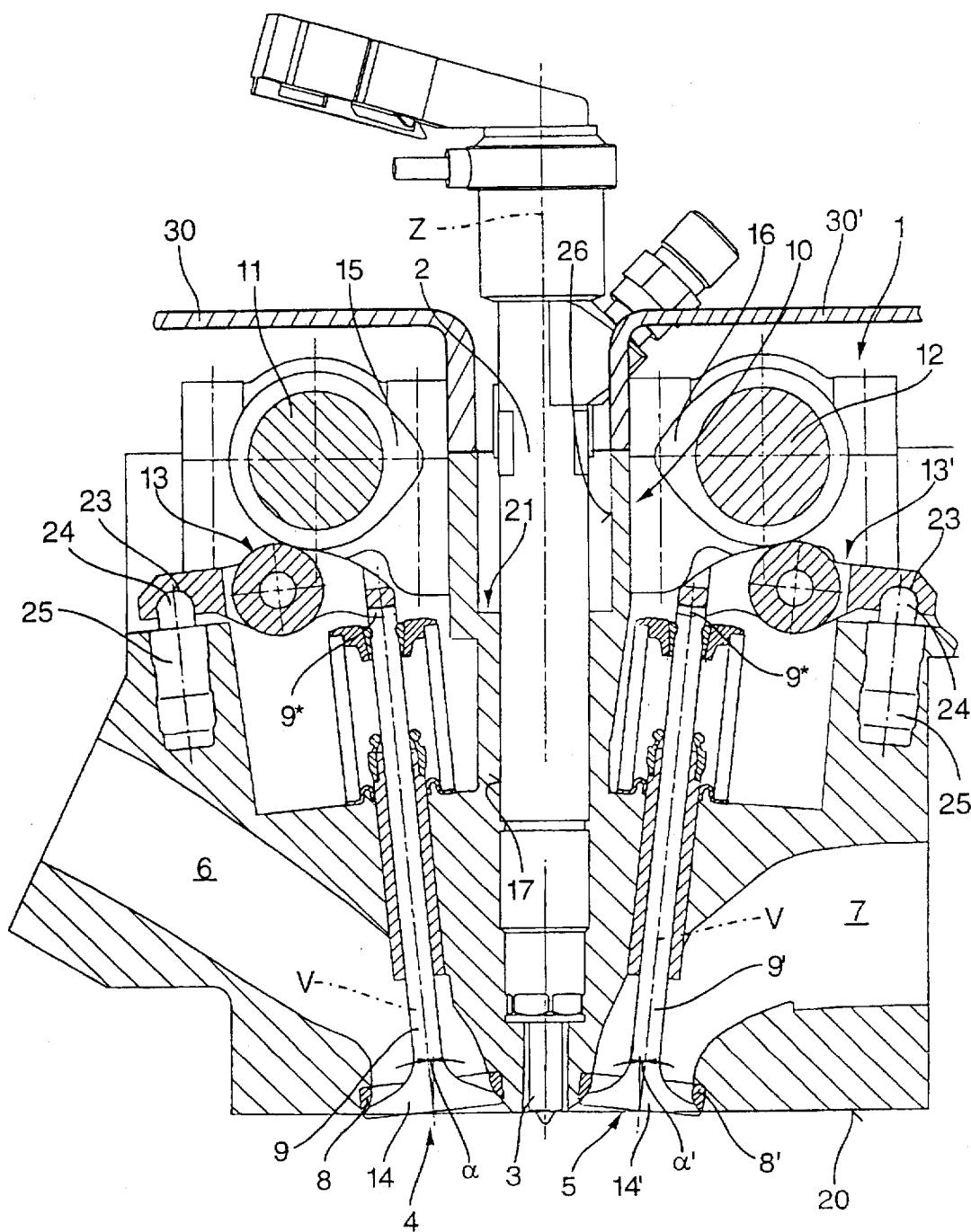
FIG. 3 is a cross-sectional view taken along line III—III of FIG. 1.

FIG. 3 is a cross-sectional view taken along line III—III of FIG. 1 wherein the intake valve 4 and the exhaust valve 5 appear to be disposed in one plane although, they are actually disposed in different planes because the valves are turned with respect to the longitudinal center axis. The valves 4 and 5 are arranged at the cylinder head bottom 20 and comprise each a valve disc 14, 14' and a valve shaft 9, 9' as well as a valve seat ring 8, 8'. The intake valve 4 closes an air intake passage 6 and the exhaust valve 5 closes an exhaust gas passage 7.

Between the valves 4 and 5, there is the injection nozzle 3, that is, the lower end of the injector 2 extending along the cylinder axis Z. The injector 2 is supported in the bore 17 of the cylinder head 1, the injector trough extending above the bore 17. The injector trough wall 26 extends upwardly from the bottom surface 21. The wall 26 extends around the injectors 2 in an arc so that it surrounds the injectors at a distance. On opposite sides of the injector trough 10, there are the camshafts 11 and 12 which carry the intake cams 15 and the exhaust cams 16. At the upper ends 9*, the valve shafts 9, 9' are engaged by the ends of the roller rocker arms 13, 13' which, at their opposite ends, have ball sockets 23 by which they are supported on ball heads 24 of a hydraulic valve adjustment element 25. Cylinder head covers 30, 30' are placed onto the upper edges of the injector trough 10 and are sealingly connected thereto. The cylinder head covers 30, 30' cover the camshafts 11, 12 and the roller rocker arms 13, 13' and, in this way, delineate the oil space.

As further apparent from FIG. 3, the valve axes V of the valves 4, 5 are inclined with respect to the longitudinal cylinder axis 2, the angle $\alpha$, $\alpha'$ between the cylinder axis 2 and the valve axes V being between 2° and 15°, preferably about 6° to 8°.

In the embodiment of FIG. 3, the inclination of the valve axes V is the same for both valves that is $\alpha=\alpha'$, but the valves may be so arranged that $\alpha$ and $\alpha'$ have different values.

Figure 4:
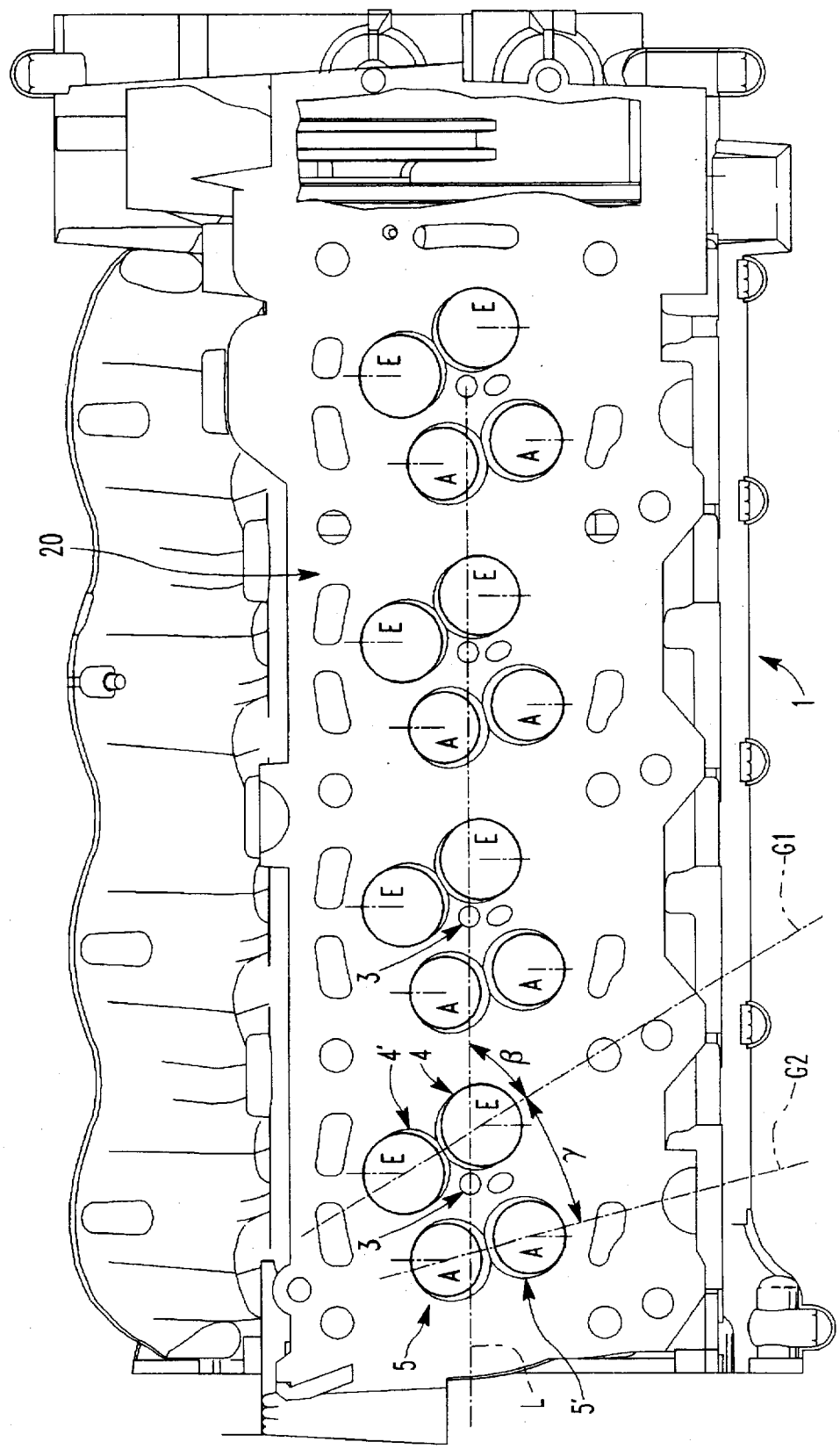
FIG. 4 is a plane bottom view of the cylinder head.

FIG. 4 shows the bottom surface 20 of the cylinder head 1 so that the arrangement of the valves 4, 4', 5, 5' with respect to the longitudinal center line L can be seen. As shown, the valve arrangements are the same for each cylinder. Four valves are arranged around each injector nozzle 3. In each case, one exhaust valve 5 and one intake valve 4' are disposed at one side of the longitudinal center line L whereas another exhaust valve 5' and another intake valve 4 are disposed at the other side of the longitudinal center line L. These locations of the valves 4, 4', 5, 5' provide for an assymmetrical arrangement which is turned somewhat with respect to the longitudinal center line L. But as it is made clear in FIG. 4, the axes of the inlet valves 4, 4' intersect a first line G1 which extends in the plane of the cylinder head bottom 20 at an angle β of about 60° with respect to the longitudinal center line L and the axes of the exhaust valves 5, 5' of the same cylinder intersect a second line G2 which extends in the plane of the cylinder head bottom 20 at an angle α of about 75° with respect to the longitudinal center line L.

What is claimed is:

1. A cylinder head for an internal combustion engine having a plurality of cylinders arranged in line, said cylinder head having a longitudinal center line and including two intake valves and two exhaust valves for each cylinder of which one of the intake and one of the exhaust valves of each cylinder are disposed at opposite sides of said longitudinal center line, an injector mounted in said cylinder head in the center of the cross-sectional area of each cylinder and having an injection nozzle tip extending from said cylinder head, said intake and exhaust valves being grouped around said central injection nozzle tip, said cylinder head having a top including an injector trough extending centrally along said cylinder head top and having bores extending from said trough centrally into the respective cylinders for receiving and supporting said injectors, intake and exhaust valve rocker arms mounted on opposite sides of said injector trough and engaging the respective intake and exhaust valves and a camshaft mounted on each side of said injector trough above the respective intake and exhaust valve rocker arms and having intake and exhaust cams disposed adjacent the respective intake and exhaust valve rocker arms for operating said intake and exhaust valves.

2. A cylinder head according to claim 1, wherein said bores for receiving said fuel injectors extend co-axially with the cylinder axes of the respective engine cylinders.

3. A cylinder head according to claim 1, wherein said injector trough is integrally cast into said cylinder head.

4. A cylinder head according to claim 1, wherein said valves have shafts with axes which are inclined with respect to the cylinder axis and enclose with the cylinder axis a valve inclination angle of between 2° and 15°.

5. A cylinder head according to claim 4, wherein said angle is 6° to 8°.

6. A cylinder head according to claim 4, wherein said valve inclination angles between said valves and the cylinder axis are all the same.

7. A cylinder head according to claim 4, wherein the valve inclination angles of at least two of the valves of one cylinder are different.

8. A cylinder head according to claim 4, wherein said valve shafts have a certain height and said injector trough has a bottom surface disposed about at the same level as the top ends of said valve shafts.

9. A cylinder head according to claim 8, wherein said injector trough includes between adjacent bores a dividing wall extending upwardly from the bottom surface of said injector trough so as to provide several injector trough sections.

10. A cylinder head according to claim 9, wherein said dividing wall includes mounting means.

11. A cylinder head according to claim 1, wherein cylinder head covers are mounted on the upper edge of said injector trough and are sealed thereto.

12. A cylinder head according to claim 1, wherein said valve arrangement of each cylinder is turned with respect to the longitudinal center line such that the valve axes have different distances from the longitudinal center line.

13. A cylinder head according to claim 12, wherein the valve axes of the intake valves of a cylinder intersect a first straight line which is disposed in the bottom plane of said cylinder head at an angle of about 60° with respect to the longitudinal center line.

14. A cylinder head according to claim 13, wherein the valve axis of the exhaust valves of a cylinder intersect a second straight line disposed in the bottom plane of said cylinder head at an angle of about 75° with respect to the longitudinal center line.

15. A cylinder head according to claim 1, wherein each of said camshafts includes cams for operating intake valves and cams for operating exhaust valves.

16. A cylinder head according to claim 15, wherein said cams for operating said intake valves and said cams for operating said exhaust valves are arranged in an alternate fashion on each of said camshafts.

17. A cylinder head according to claim 1, wherein said rocker arms include rollers for engagement by said cams, said rocker arms having one end supported on a ball joint socket and the opposite end disposed on the ends of the valve shafts.

18. A cylinder head according to claim 1, wherein said injector trough has side walls extending in an arc around said injectors so as to provide for a wider trough area around said injectors with a gap between said side walls and said injectors and said trough is narrower in the area between injectors.

19. A cylinder head according to claim 18, wherein said trough wall is inwardly arched in the areas between injectors.

* * * * *